United States Patent
Inagi et al.

(10) Patent No.: US 9,704,504 B2
(45) Date of Patent: Jul. 11, 2017

(54) VOICE ANALYSIS DEVICE AND VOICE ANALYSIS SYSTEM

(71) Applicants: Seiya Inagi, Yokohama (JP); Haruo Harada, Yokohama (JP); Hirohito Yoneyama, Ebina (JP); Kei Shimotani, Ashigarakami-gun (JP); Akira Fujii, Yokohama (JP); Kiyoshi Iida, Yokohama (JP)

(72) Inventors: Seiya Inagi, Yokohama (JP); Haruo Harada, Yokohama (JP); Hirohito Yoneyama, Ebina (JP); Kei Shimotani, Ashigarakami-gun (JP); Akira Fujii, Yokohama (JP); Kiyoshi Iida, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 139 days.

(21) Appl. No.: 14/791,794

(22) Filed: Jul. 6, 2015

(65) Prior Publication Data

US 2016/0260439 A1  Sep. 8, 2016

(30) Foreign Application Priority Data

Mar. 3, 2015  (JP) ................. 2015-041710

(51) Int. Cl.
| | |
|---|---|
| G10L 15/00 | (2013.01) |
| G10L 17/00 | (2013.01) |
| G10L 21/02 | (2013.01) |
| G10L 25/21 | (2013.01) |
| G10L 17/06 | (2013.01) |
| G10L 25/18 | (2013.01) |

(52) U.S. Cl.
CPC .............. G10L 21/02 (2013.01); G10L 17/00 (2013.01); G10L 25/21 (2013.01); *G10L 17/06* (2013.01); *G10L 25/18* (2013.01)

(58) Field of Classification Search
CPC ......... G10L 21/02; G10L 17/00; G10L 25/21; G10L 17/06; G10L 25/18
USPC .......................... 704/208, 231, 246, 251, 270
See application file for complete search history.

(56) References Cited

U.S. PATENT DOCUMENTS

2009/0296526 A1  12/2009  Amada

FOREIGN PATENT DOCUMENTS

| JP | 2009-288215 A | 12/2009 |
|---|---|---|
| JP | 2014191069 A | * 10/2014 |

* cited by examiner

*Primary Examiner* — Thierry L Pham
(74) *Attorney, Agent, or Firm* — Oliff PLC

(57) ABSTRACT

The voice analysis device includes: a voice information acquiring unit that acquires a voice signal generated by plural voice acquiring units disposed at different distances from a speaking section of a speaker and acquiring voice of the speaker; and an identification unit that identifies the speaker corresponding to the voice having been acquired, on the basis of intensities of respective peaks in a frequency spectrum of a first enhanced waveform and a frequency spectrum of a second enhanced waveform. The first enhanced waveform is a waveform where a voice signal of a predetermined target speaker has been enhanced, and the second enhanced waveform is a waveform where a voice signal of a speaker other than the target speaker has been enhanced.

9 Claims, 11 Drawing Sheets

FIG.4A    ORIGINAL WAVE FORM
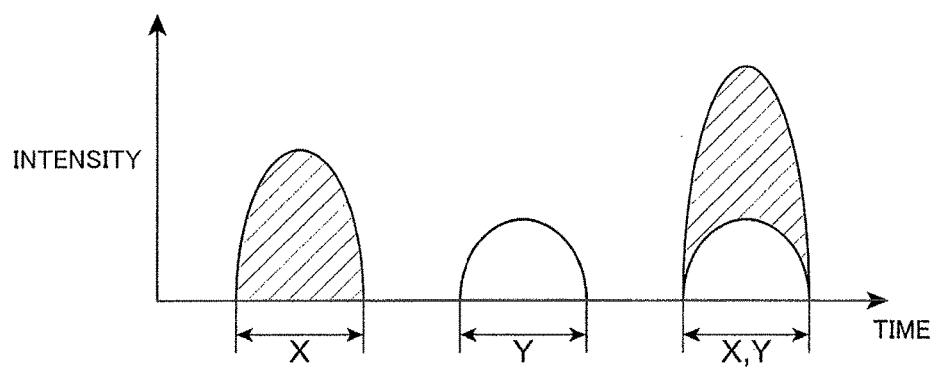
FIG.4B    TARGET-SOUND ENHANCEMENT WAVEFORM
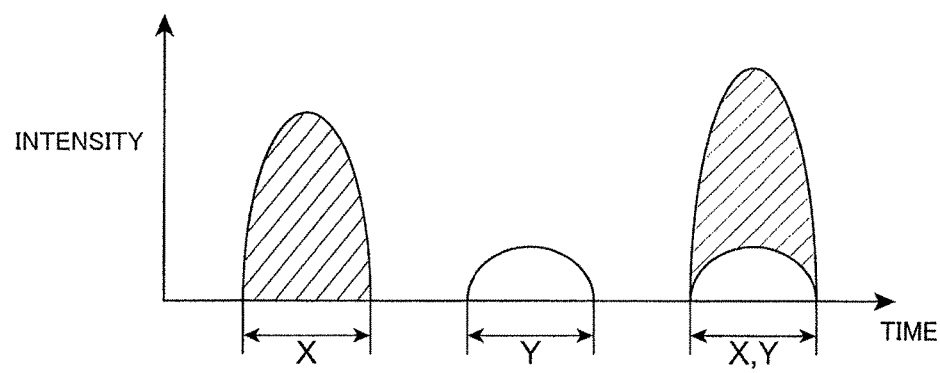
FIG.4C    NONTARGET-SOUND ENHANCEMENT WAVEFORM
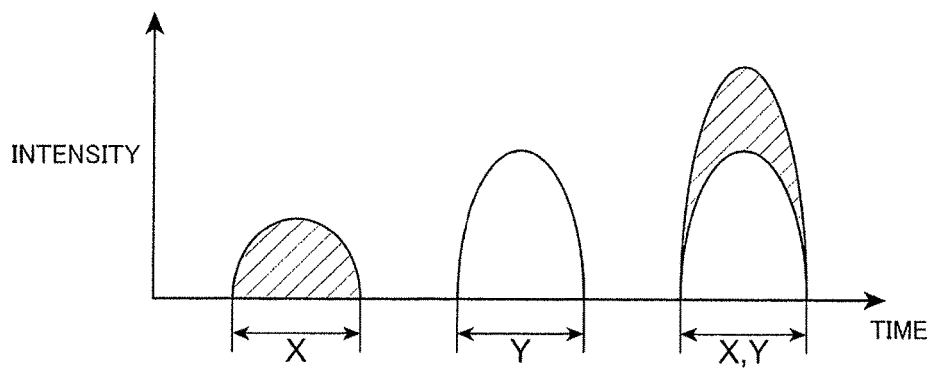

VOICE ANALYSIS DEVICE AND VOICE ANALYSIS SYSTEM

CROSS REFERENCE TO RELATED APPLICATION

This application is based on and claims priority under 35 USC §119 from Japanese Patent Application No. 2015-41710 filed Mar. 3, 2015.

BACKGROUND

Technical Field

The present invention relates to a voice analysis device, and a voice analysis system.

Related Art

There has been a technique using microphones to estimate a direction of production of sound captured by the microphones.

SUMMARY

According to an aspect of the present invention, there is provided a voice analysis device including: a voice information acquiring unit that acquires a voice signal generated by plural voice acquiring units disposed at different distances from a speaking section of a speaker and acquiring voice of the speaker; and an identification unit that identifies the speaker corresponding to the voice having been acquired, on the basis of intensities of respective peaks in a frequency spectrum of a first enhanced waveform and a frequency spectrum of a second enhanced waveform. The first enhanced waveform is a waveform where a voice signal of a predetermined target speaker has been enhanced, and the second enhanced waveform is a waveform where a voice signal of a speaker other than the target speaker has been enhanced.

BRIEF DESCRIPTION OF THE DRAWINGS

An exemplary embodiment of the present invention will be described in detail based on the following figures, wherein:

FIG. 4A is a graph showing waveforms of the voice signals used for obtaining the target-sound enhancement waveforms and the nontarget-sound enhancement waveforms;

FIG. 4B is a graph of the target-sound enhancement waveforms obtained on the basis of the voice signals shown in FIG. 4A;

FIG. 4C is a graph of the nontarget-sound enhancement waveforms obtained on the basis of the voice signals shown in FIG. 4A;

DETAILED DESCRIPTION

<Example of System Configuration>

Figure 1:
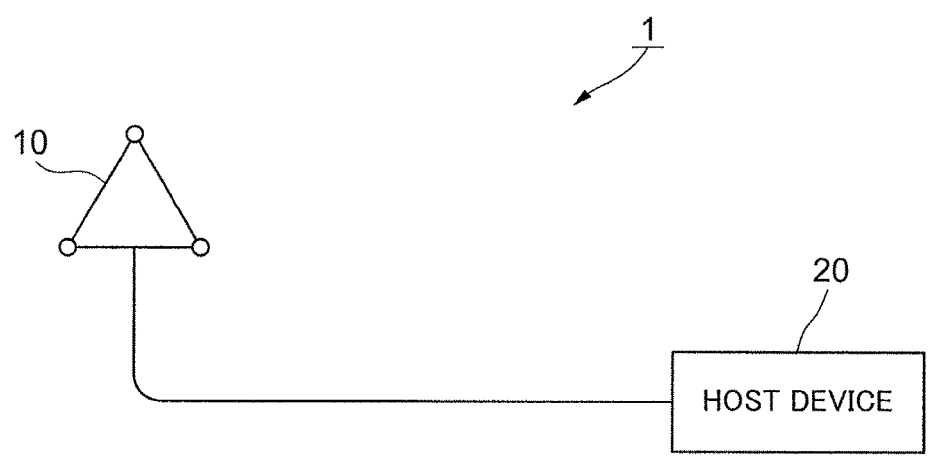
FIG. 1 is a diagram showing an example of a configuration of a sound analysis system according to the exemplary embodiment.

FIG. 1 is a diagram showing an example of a configuration of a sound analysis system according to the exemplary embodiment.

As shown in FIG. 1, a voice analysis system 1 of the exemplary embodiment includes a terminal device 10 as one example of a voice analysis device, and a host device 20 as one example of a sound analysis device. The terminal device 10 and the host device 20 are connected through a predetermined communication line. This communication line may be a wired communication line or a wireless communication line. If the wireless communication line is used, a line on which a known method such as Wi-Fi (Wireless Fidelity), Bluetooth (registered trademark in Japan), ZigBee, or UWB (Ultra Wideband) is employed may be Used. Note that, although only one terminal device 10 is shown in FIG. 1, plural terminal devices 10 may be installed.

Figure 2:
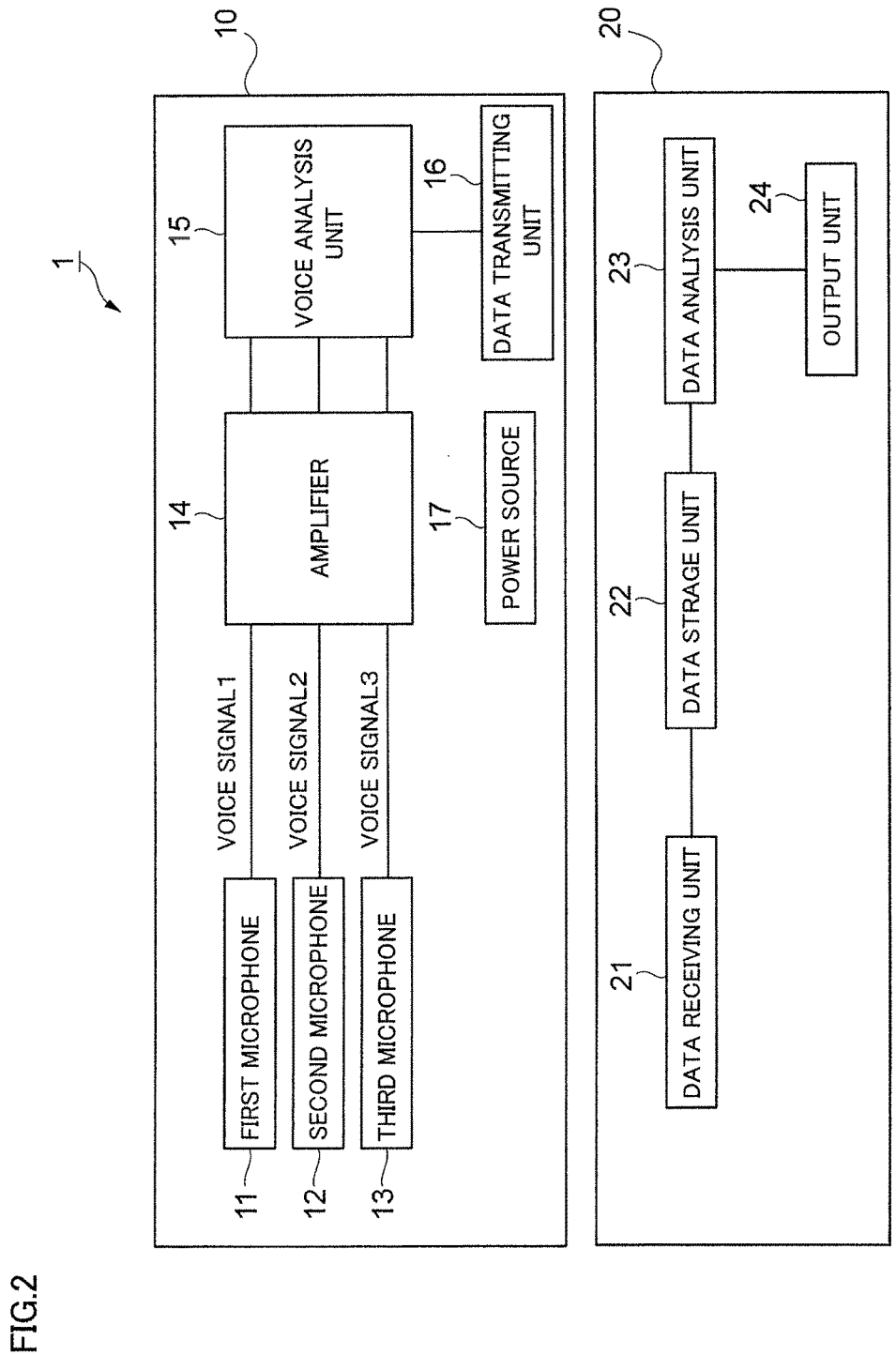
FIG. 2 is a diagram showing an example of a functional configuration of the terminal device and the host device in the exemplary embodiment.

FIG. 2 is a diagram showing an example of a functional configuration of the terminal device 10 and the host device 20 in the exemplary embodiment.

As shown in the figure, the terminal device 10 includes plural microphones 11, 12, and 13 (a first microphone 11, a second microphone 12, and a third microphone 13) as voice acquiring units that acquire voice of a speaker, and an amplifier 14. The terminal device 10 further includes a voice analysis unit 15 analyzing the acquired voice, a data transmitting unit 16 for transmitting the analysis result to the host device 20, and a power source 17.

The first microphone 11, the second microphone 12, and the third microphone 13 are disposed at peak positions of a regular triangle, which will be described in detail with reference to FIG. 3. The first microphone 11, the second microphone 12, and the third microphone 13 are arranged along the horizontal plane, for example. The microphones used as the first microphone 11, the second microphone 12, and the third microphone 13 of the exemplary embodiment may be chosen from existing microphones of various types such as a dynamic type and a condenser type. In particular, an omnidirectional microphone of micro electro mechanical systems (MEMS) may be chosen.

The amplifier 14 amplifies electric signals (voice signals) which are output from the first microphone 11, the second microphone 12, and the third microphone 13 in response to the acquired sound. An amplifier such as an existing operational amplifier may be used as the amplifier 14 in the exemplary embodiment.

The voice analysis unit 15 analyzes the voice signals output from the amplifier 14. The voice analysis unit 15 identifies which speaker has speaking voice corresponding to the voice acquired by the first microphone 11, the second microphone 12, and the third microphone 13. Specific contents of the processing for the voice identification will be described later. The voice analysis unit 15 functions as one example of a voice information acquiring unit and an identification unit.

The data transmitting unit 16 transmits the acquired data including the analysis result from the voice analysis unit 15, to the host device 20 via the aforementioned wireless communication line or a wired communication line such as the Internet in addition to the wireless communication line. The information transmitted to the host device 20 may include information such as time when the voice is acquired by the first microphone 11, the second microphone 12 and the third microphone 13, and the pressure of the acquired voice in addition to the aforementioned analysis result, depending on the contents of the processing performed by the host device 20. A data storage unit for storing the analysis result from the voice analysis unit 15 may be provided in the terminal device 10 to collectively transmit the data stored in a certain period. Note that the information may be transmitted via only the wired communication line.

The power source 17 supplies electric power to the first microphone 11, the second microphone 12, the third microphone 13, the amplifier 14, the voice analysis unit 15, and the data transmitting unit 16, which have been described above. A known power source such as a dry-cell battery or a rechargeable battery is used as the power source. The power source 17 includes a known circuit such as a voltage conversion circuit or a recharge control circuit, if necessary.

The host device 20 includes a data receiving unit 21 that receives the data transmitted from the terminal device 10, a data storage unit 22 in which the received data is stored, a data analysis unit 23 that analyzes the stored data, and an output unit 24 that outputs the analysis result. The host device 20 is realized by, for example, an information processor such as a personal computer. If the plural terminal devices 10 are used in the exemplary embodiment, the host device 20 receives data from the plural terminal devices 10. Note that a relay device that relays data transfer may be provided between the terminal device 10 and the host device 20. In this case, the relay device may have a function for performing analysis and calculation, and adding data such as time, and the ID of the relay server.

The data receiving unit 21 receives data from the respective terminal devices 10 or the relay device, and transmits the data to the data storage unit 22.

The data storage unit 22 is realized by, for example, a memory such as a magnetic disk drive of a personal computer, and the received data acquired from the data receiving unit 21 is stored in the data storage unit 22.

The data analysis unit 23 is realized by, for example, a CPU controlled by a program in a personal computer, and the data analysis unit 23 analyzes the data stored in the data storage unit 22. The specific contents and technique of the analysis may be chosen from various contents and techniques, depending on the utilization purpose or configuration of the system in the exemplary embodiment. For example, a frequency of conversation between speakers or tendency of a speaker regarding a conversation partner may be analyzed, or relationship with a conversation partner may be estimated on the basis of the length of each speaking in the conversation and information of sound pressure. The data analysis unit 23 determines the conversational relationship between a target speaker and the other speaker in the exemplary embodiment, which will be described in detail below.

The output unit 24 outputs analysis result from the data analysis unit 23, and outputs data based on the analysis result. The unit outputting the analysis result and the like may be chosen from various units using a web display, display, print output by a printer, and audio output, depending on the utilization purpose and configuration of the system, the contents and format of the analysis result, and the like.

<Description of a Pair of Two Microphones and Phase Difference Between Voice Signals>

Figure 3:
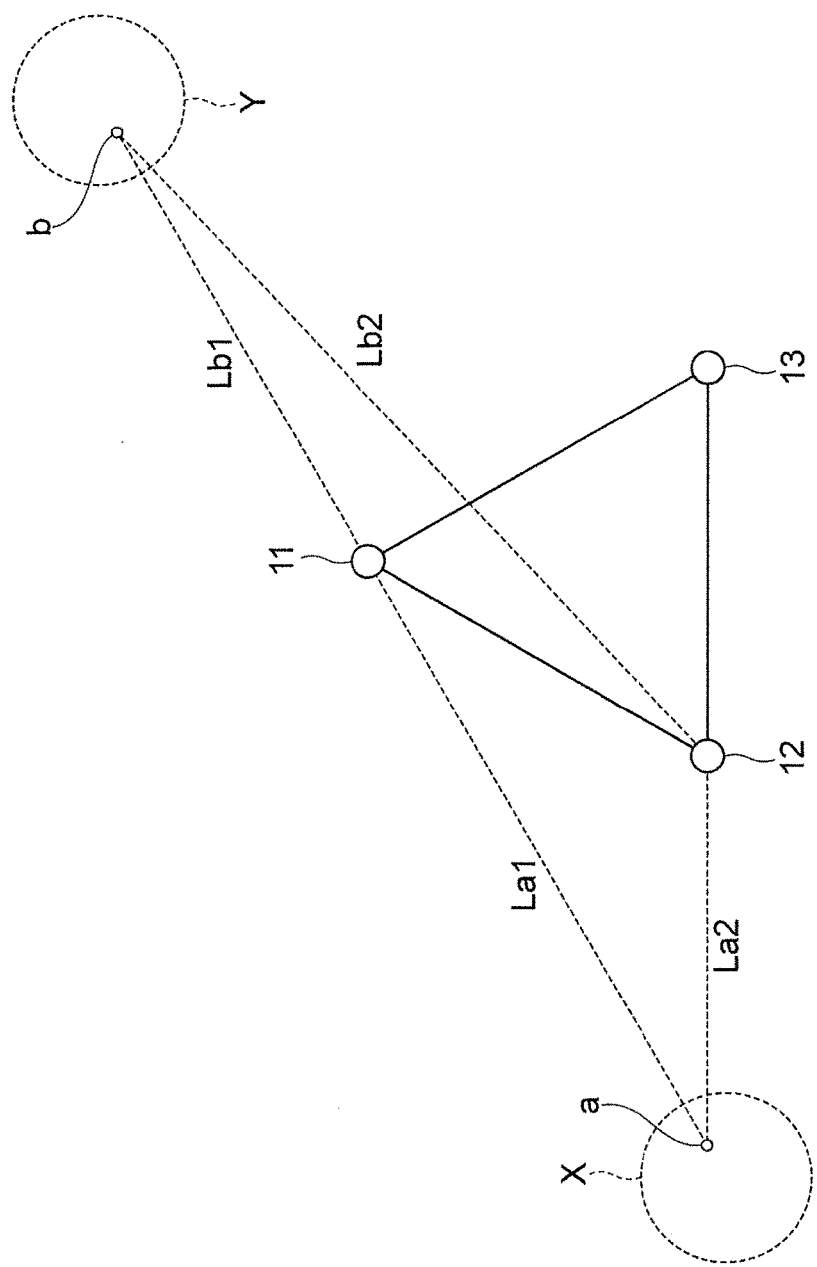
FIG. 3 is a diagram showing a positional relationship between the terminal device and each of mouths (speaking sections) of speakers.

FIG. 3 is a diagram showing a positional relationship between the terminal device 10 and each of mouths (speaking sections) of speakers.

In the exemplary embodiment, one speaker is chosen as a target speaker. The terminal device 10 identifies whether the voice of the speaker acquired by the microphones 11, 12 and 13 corresponds to the speaking voice of the target speaker or speaking voice of a speaker other than the target speaker.

FIG. 3 shows a situation where the target speaker X and a speaker Y other than the target speaker make a conversation around the terminal device 10. Positional relationships between the first microphone 11, the second microphone 12, a sound source a as the speaking section of the target speaker X and a sound source b as the speaking section of the speaker Y will be assessed under the situation.

The distance between the sound source a and the first microphone 11 is set at La1, and the distance between the sound source a and the second microphone 12 is set at La2 in the relationship shown in FIG. 3. Further, the distance between the sound source b and the first microphone 11 is set at Lb1, and the distance between the sound source b and the second microphone 12 is set at Lb2.

In this case, the speaking voice of the target speaker X from the sound source a travels to and reaches each of the first microphone 11 and the second microphone 12 through the air at the speed of sound. If La1 and La2 are different from each other, time difference between the time when the speaking voice reaches the first microphone 11 and the time when the speaking voice reaches the second microphone 12 is caused in accordance with the difference between the distances. The same is true in the case of the speaker Y. That is, the time difference between the time when the voice of the speaker Y from the sound source b reaches the first microphone 11 and the time when the voice of the speaker Y from the sound source b reaches the second microphone 12 is caused in accordance with the difference between the distance Lb1 and the distance Lb2.

Although the voice signals output from the first microphone 11 and the second microphone 12 have approximately the same waveform for each of the target speaker X and the speaker Y, the phase difference between the voice signals is generated in accordance with the time difference.

<Description of Identification of Speaking Voice>

The phase difference between the voice signals is used to identify which speaker has the speaking voice corresponding to the voice of the speaker acquired by the microphones 11, 12 and 13 in the exemplary embodiment.

Specifically, a target-sound enhancement waveform (a first enhanced waveform) in which the voice signal of the target speaker X has been enhanced and a nontarget-sound enhancement waveform (a second enhanced waveform) in which the voice signal of the speaker Y other than the target speaker X has been enhanced are firstly calculated. Examples of enhancing the target sound include amplification of a signal from a certain direction (direction where the target sound is produced), amplification of a signal from the certain direction and suppression of signals from the other directions, suppression of signals from the other directions without processing the signal from the certain direction, and extraction of the voice only from the certain direction.

The target-sound enhancement waveform and the nontarget-sound enhancement waveform may be calculated by a known method. Specifically, they may be calculated by a method using a spatial filter utilizing the aforementioned phase difference, for example.

FIG. 4A is a graph showing waveforms of the voice signals used for obtaining the target-sound enhancement waveforms and the nontarget-sound enhancement waveforms. Here, the horizontal axis indicates time, and the vertical axis indicates the intensity of the voice signals. The figure shows the waveforms of the voice signals output from any of the first microphone 11 and the second microphone 12, and they are referred to as original waveforms. Note that the actual waveforms of the voice signals have a saw-tooth shape. However, illustration thereof is simplified by using a spindle shape to make the description easier.

FIG. 4A shows the voice signals in the case where the target speaker X speaks first, the speaker Y speaks next, and then the target speaker X and the speaker Y speak at the same time. In other words, the speaking period of the target speaker X is firstly shown, and then the speaking period of the target speaker Y is shown in FIG. 4A. Further, the simultaneous speaking period which is the speaking period of the target speaker X and is also the speaking period of the speaker Y is lastly shown.

FIG. 4B is a graph of the target-sound enhancement waveforms obtained on the basis of the voice signals shown in FIG. 4A. As shown in FIG. 4B, the intensity of the voice signal at the speaking period of the target speaker X is increased, whereas the intensity of the voice signal at the speaking period of the speaker Y is decreased in comparison with the case in FIG. 4A. That is, the waveforms in which the voice of the target speaker X has been enhanced are obtained.

Note that the voice signal at the simultaneous speaking period of the target speaker X and the speaker Y is expressed by a synchronized waveform in which the increased voice signal of the target speaker X and the decreased voice signal of the speaker Y have been synchronized.

FIG. 4C is a graph of the nontarget-sound enhancement waveforms obtained on the basis of the voice signals shown in FIG. 4A.

As shown in the figure, the intensity of the voice signal at the speaking period of the target speaker X is decreased, whereas the intensity of the voice signal at the speaking period of the speaker Y is increased in comparison with the case in FIG. 4A. That is, the waveforms in which the voice of the speaker Y has been enhanced are obtained.

Note that the voice signal at the simultaneous speaking period of the target speaker X and the speaker Y is expressed by a synchronized waveform in which the decreased voice signal of the target speaker X and the increased voice signal of the speaker Y have been synchronized.

For example, there is a method for discriminating between the speaking voice of the target speaker X and the speaking voice of the speaker Y on the basis of the ratio between the intensity of the target-sound enhancement waveform and the intensity of the nontarget-sound enhancement waveform.

Figure 5:
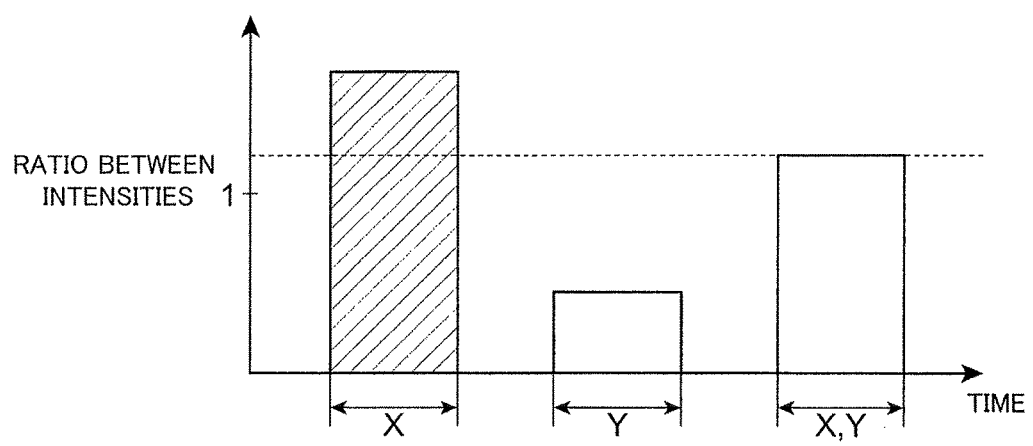
FIG. 5 is a graph showing the ratio between the intensity of the target-sound enhancement waveform and the intensity of the nontarget-sound enhancement waveform.

FIG. 5 is a graph showing the ratio between the intensity of the target-sound enhancement waveform and the intensity of the nontarget-sound enhancement waveform. In this case, the ratio between the intensities is obtained by (the intensity of the target-sound enhancement waveform in FIG. 4B)/(the intensity of the nontarget-sound enhancement waveform in FIG. 4C).

As described above, the intensity of the voice signal in the target-sound enhancement waveform is increased whereas the intensity of the voice signal in the nontarget-sound enhancement waveform is decreased, at the speaking period of the target speaker X. Thus, the ratio between the intensities is larger than 1.

On the other hand, the intensity of the voice signal in the target-sound enhancement waveform is decreased whereas the intensity of the voice signal in the nontarget-sound enhancement waveform is increased, at the speaking period of the speaker Y. Thus, the ratio between the intensities is less than 1.

Consequently, if a predetermined value is set as a threshold, the speaking voice is determined to correspond to the target speaker X when the ratio between the intensities is larger than the threshold, and the speaking voice is determined to correspond to the speaker Y when the ratio between the intensities is less than the threshold. Note that, the threshold is set around 1.2 in FIG. 5.

However, the ratio between the intensities at the simultaneous speaking period of the target speaker X and the speaker Y is the value between the value at the speaking period of the target speaker X and the value at the speaking period of the target speaker Y. In the case of the simultaneous speaking period, the ratio between the intensities is unstable in comparison with the case where only the target speaker X or the speaker Y speaks. Thus, the value thereof tends to vary considerably, and the simultaneous speaking is difficult to be determined by the method in which the threshold is set. Moreover, the period is determined to be the speaking period of any one of the target speaker X and the speaker Y, and incorrect determination is caused.

In the exemplary embodiment, the above problem may be reduced by a following method for discriminating between the speaking voice of the target speaker X and the speaking voice of the speaker Y.

In the exemplary embodiment, the Fourier transform is performed on each of the target-sound enhancement waveform and the nontarget-sound enhancement waveform, and the frequency spectra are obtained. Then, the speaker corresponding to the acquired voice is identified on the basis of the intensity of the peak in each of the frequency spectra.

Figure 6A:
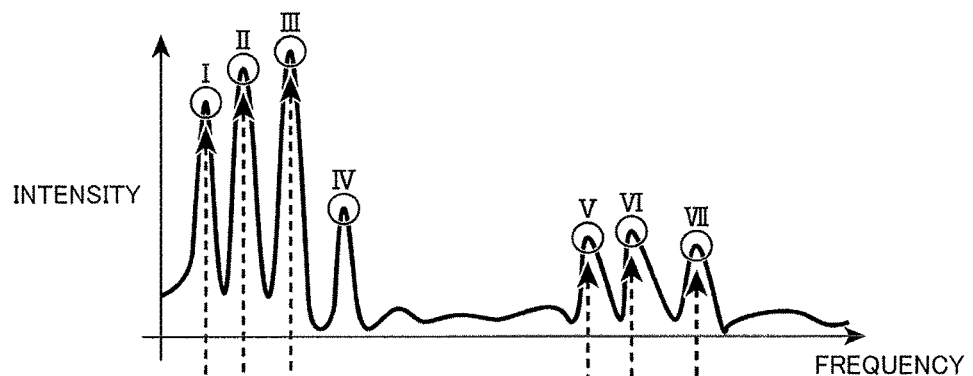
FIGS. 6A to 6C are graphs showing frequency spectra obtained by the Fourier transform performed on the original waveform, the target-sound enhancement waveform, and the nontarget-sound enhancement waveform, which are shown in FIGS. 4A to 4C.
Figure 6B:
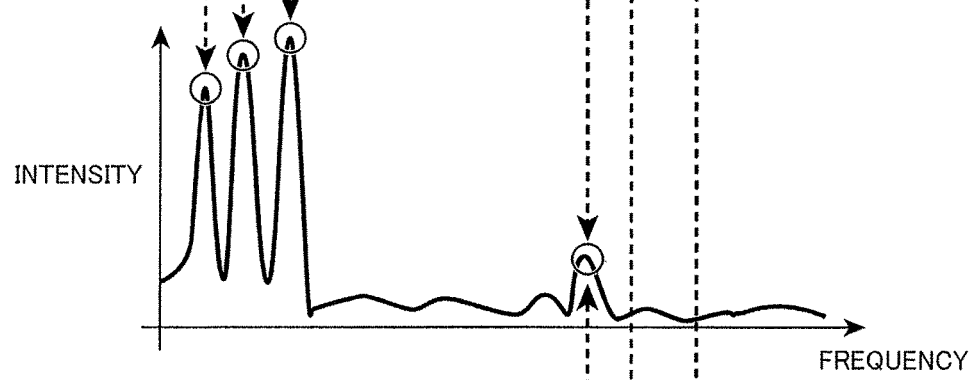
Figure 6C:
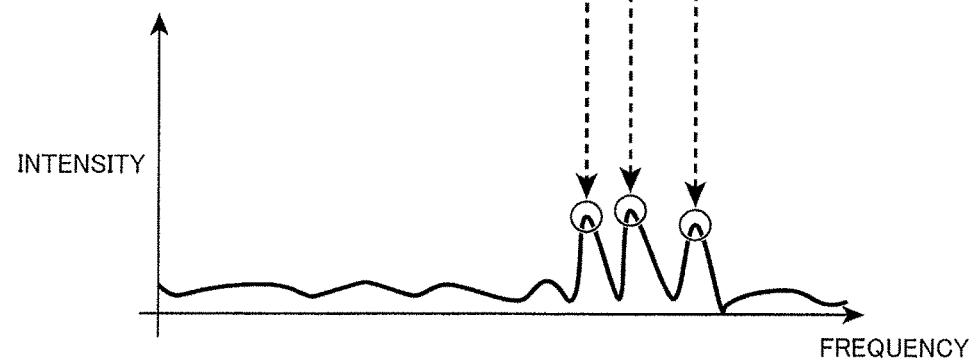
Figure 7:
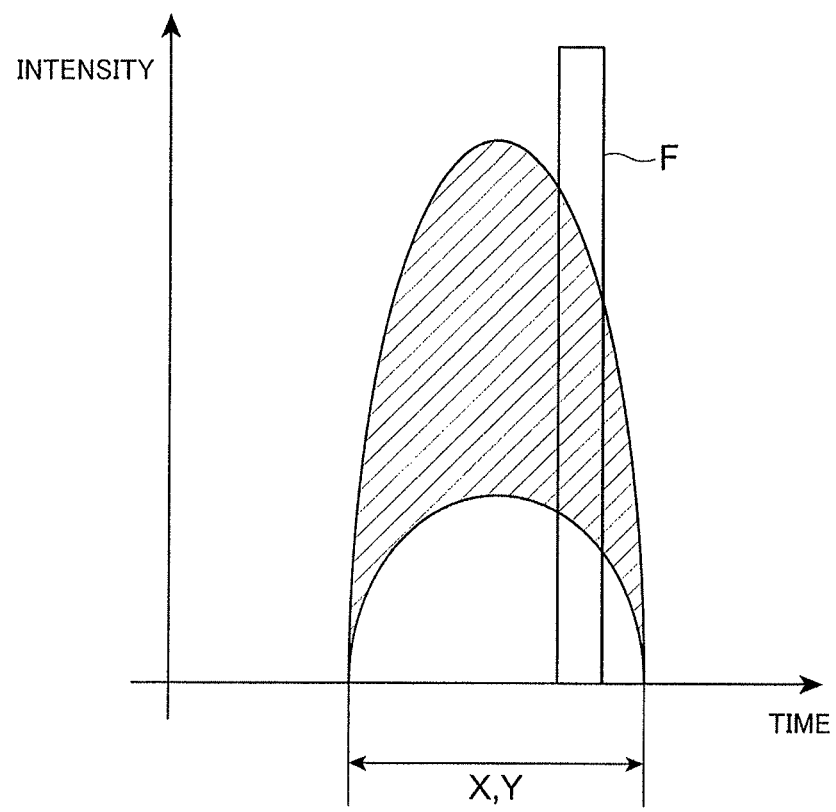
FIG. 7 is a graph showing the time frame.

FIGS. 6A to 6C are graphs showing frequency spectra obtained by the Fourier transform performed on the original waveform, the target-sound enhancement waveform, and the nontarget-sound enhancement waveform, which are shown in FIGS. 4A to 4C. In FIGS. 6A to 6C, the horizontal axis indicates the frequency, and the vertical axis indicates the intensity. Note that a time frame F is set in the simultaneous speaking period of the target speaker X and the speaker Y as shown in FIG. 7, and the Fourier transform is performed on each of the original waveform, the target-sound enhancement waveform and the nontarget-sound enhancement waveform in the time frame F.

Then, peaks are detected in the waveforms of the frequency spectra in FIGS. 6A to 6C. Here, the detected peaks are denoted by I to VII.

Next, the peaks at the same frequency are found in the waveforms. The peaks I to III, and V are common in FIG. 6A and FIG. 6B. The peaks V to VII are common in FIG. 6A and FIG. 6C. Note that, since the peak IV is not common, it is excluded from the detection.

The ratio between the intensities of the peaks at the same frequency is calculated.

In this case, (the intensity of the peak of the original waveform)/(the intensity of the peak of the target-sound enhancement waveform) is calculated to obtain the ratio, for example.

In the case where the predetermined threshold (the first threshold) is exceeded at any peak, the acquired voice is determined to be the speaking voice of the target speaker X. In this example, if the first threshold is exceeded at any of the peaks I to III and V, the acquired voice is determined to be the speaking voice of the target speaker X. In this example, the first threshold is exceeded at the peaks I to III.

Further, (the intensity of the peak of the original waveform)/(the intensity of the peak of the nontarget-sound enhancement waveform) is calculated to obtain the ratio.

In the case where the predetermined threshold (the second threshold) is exceeded at any peak, the acquired voice is determined to be the speaking voice of the speaker Y. In this example, if the second threshold is exceeded at any of the peaks V to VII, the acquired voice is determined to be the speaking voice of the speaker Y. In this example, the second threshold is exceeded at all of the peaks V to VII.

Thus, in this case, the section at the time frame F is determined to be the speaking period of the target speaker X and the speaking period of the speaker Y. That is, it is determined to be the simultaneous speaking period of the target speaker X and the speaker Y.

Note that the determination of which speaker has made the speaking voice is performed on the basis of each ratio between the intensities of the peaks at the same frequency in this example. However, the determination is not limited to the above, and may be performed on the basis of the difference between the intensities.

As described above, the peaks at the same frequencies in at least two of the frequency spectra containing a frequency spectrum of the original waveform, the target-sound enhancement waveform, and the nontarget-sound enhancement waveform are found in the exemplary embodiment.

Further, the intensities of the peaks at the same frequencies are used to identify which speaker has the speaking voice corresponding to the acquired voice. More specifically, the magnitude relationship between the intensities of the peaks at the same frequencies is used to identify which speaker has the speaking voice corresponding to the acquired voice.

The frequency spectrum differs between speakers, and the frequencies at which the peaks in the frequency spectrum are located also differ between speakers. Thus, the peaks are distinguished in the frequency spectrum even in the case of the simultaneous speaking. Consequently, a speaker who has spoken may be identified on the basis of the frequencies at which the peaks are located.

Specifically, the frequencies at which the peaks corresponding to the speaking voice of the target speaker X in the frequency spectrum are located do not change between the frequency spectrum of the original waveform and the frequency spectrum of the target-sound enhancement waveform. The intensity of the frequency spectrum of the target-sound enhancement waveform is enhanced in comparison with the intensity of the frequency spectrum of the original waveform. Note that the peaks are lowered in the frequency spectrum of the nontarget-sound enhancement waveform.

Thus, whether the target speaker X has spoken is determined on the basis of comparison between the intensities of the peaks in the frequency spectrum of the target-sound enhancement waveform and the intensities of the peaks in the frequency spectrum of the original waveform.

Similarly, the frequencies at which the peaks corresponding to the speaking voice of the speaker Y in the frequency spectrum are located do not change between the frequency spectrum of the original waveform and the frequency spectrum of the nontarget-sound enhancement waveform. The intensity in the frequency spectrum of the nontarget-sound enhancement waveform is enhanced in comparison with the intensity in the frequency spectrum of the original waveform. Note that the peaks are lowered in the frequency spectrum of the target-sound enhancement waveform.

Thus, whether the speaker Y has spoken is determined on the basis of comparison between the intensities of the peaks in the frequency spectrum of the nontarget-sound enhancement waveform and the intensities of the peaks in the frequency spectrum of the original waveform.

This method is available to determine if the target speaker X speaks or not and if the speaker Y speaks or not even in the case of the simultaneous speaking of the target speaker X and the speaker Y, in addition to the cases where any one of the target speaker X and the speaker Y speaks.

<Operation Example of Terminal Device>

Figure 8:
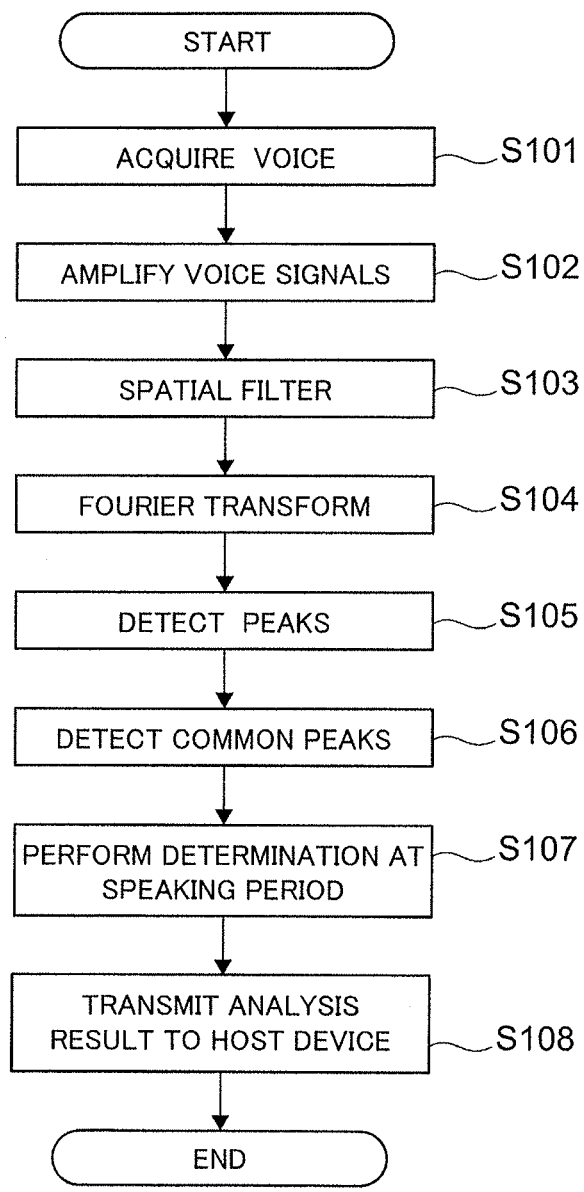
FIG. 8 is a flowchart showing the operation of the terminal device in the exemplary embodiment.

FIG. 8 is a flowchart showing the operation of the terminal device 10 in the exemplary embodiment.

As shown in FIG. 8, if the microphones 11, 12 and 13 of the terminal device 10 acquire voice (step 101), electric signals (voice signals) according to the acquired voice are transmitted to the amplifier 14 from the microphones 11, 12 and 13. Upon receiving the voice signals from the microphones 11, 12 and 13, the amplifier 14 amplifies the voice signals, and transmits the resultant signals to the voice analysis unit 15 (step 102).

The voice analysis unit 15 calculates the target-sound enhancement waveform and the nontarget-sound enhancement waveform on the basis of the transmitted voice signals (original waveforms), by using a spatial filter utilizing a phase difference (step 103).

Next, the voice analysis unit 15 sets the time frame F for each certain time unit (for example, one several tenths seconds to one several hundredths seconds), the Fourier transform is performed on the original waveform, the target-sound enhancement waveform, and the nontarget-sound enhancement waveform to obtain the frequency spectra (step 104).

Further, the voice analysis unit 15 detects peaks from the respective waveforms of the frequency spectra (step 105).

Next, common peaks at the same frequencies in these waveforms are found (step 106).

Then, the determination of which speaker has spoken at the speaking period corresponding to the section at the time frame F is performed on the basis of the intensities of the peaks at the same frequencies (step 107).

Thereafter, the voice analysis unit 15 transmits the information obtained in the processing from step 103 to step 107 (presence or absence of speaking, information on the speaker) as the analysis result to the host device 20 through the data transmitting unit 16 (step 108). At this time, the length of the speaking time of each speaker or additional information may be transmitted to the host device 20 together with the analysis result.

Figure 9:
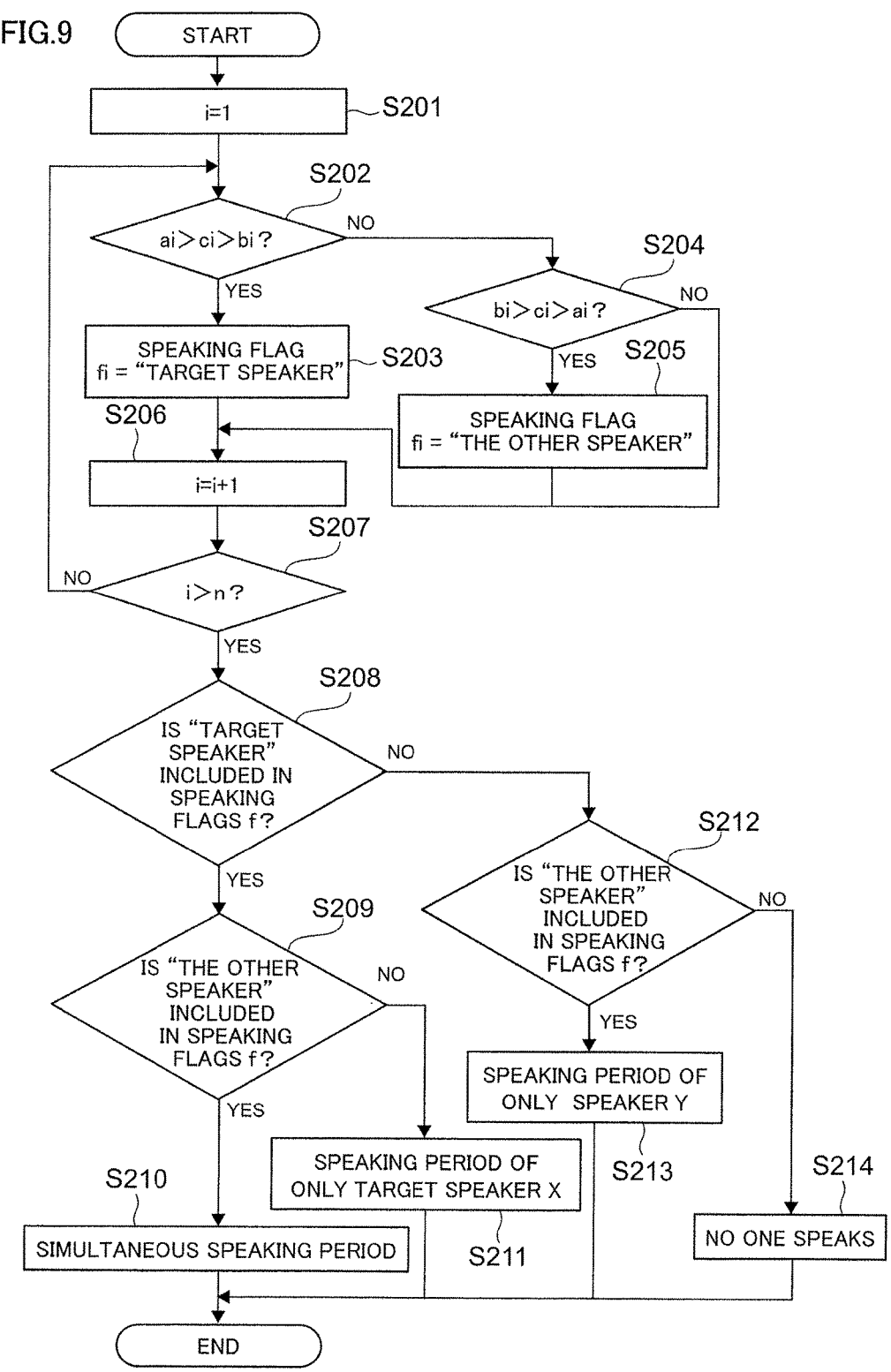
FIG. 9 is a flowchart further specifically describing the determination of the speaker, which is performed at step 107 in FIG. 8.

FIG. 9 is a flowchart further specifically describing the determination of the speaker, which is performed at step 107 in FIG. 8.

Here, the number of the peaks at the same frequencies detected at step 106 is regarded as n, and the values of the frequencies $\lambda$ at which the n peaks are located are expressed by $\lambda=\{\lambda_1, \lambda_2, \lambda_3, \ldots, \lambda_n\}$. Further, the intensities of the n peaks of the target-sound enhancement waveform at the frequencies λ are expressed by $A=\{a_1, a_2, a_3, \ldots, a_n\}$, the intensities of the n peaks of the nontarget-sound enhancement waveform at the frequencies λ are expressed by $B=\{b_1, b_2, b_3, \ldots, b_n\}$, and the intensities of the n peaks of the original waveform at the frequencies λ are expressed by $C=\{c_1, c_2, c_3, \ldots c_n\}$.

As shown in the figure, the voice analysis unit 15 firstly sets 1 in the counter i (step 201).

Next, the voice analysis unit 15 determines if $a_i>c_i>b_i$ is satisfied or not (step 202). In other words, determination of which speaker has made speaking voice is performed on the basis of the difference between the intensities.

If $a_i>c_i>b_i$ is satisfied (Yes at step 202), the speaking flag $f_i$ is set as the "target speaker" (step 203).

In contrast, if $a_i>c_i>b_i$ is not satisfied (No at step 202), the voice analysis unit 15 determines if $b_i>c_i>a_i$ is satisfied or not (step 204).

If $b_i>c_i>a_i$ is satisfied (Yes at step 204), the speaking flag $f_i$ is set as "the other speaker" (step 205).

In contrast, if $b_i>c_i>a_i$ is not satisfied (No at step 204), the peak is excluded from the determination, and the process goes to the step 206.

Next, the voice analysis unit 15 adds 1 to the counter i (step 206). Then, the voice analysis unit 15 determines if i>n is satisfied (step 207). If i>n is not satisfied (No at step 207), the process goes back to the step 202.

In contrast, if i>n is satisfied (Yes at step 207), which indicates that the speaking flags $f_i$ have been set for all of the frequencies λ corresponding to the n peaks, the voice analysis unit 15 determines if any element set as the "target speaker" is included in the speaking flags $f=\{f_1, f_2, f_3, \ldots, f_n\}$ or not (step 208).

If any element set as the "target speaker" is included (Yes at step 208), the voice analysis unit 15 determines if any element set as "the other speaker" is included in the speaking flags $f=\{f_1, f_2, f_3, \ldots, f_n\}$ or not (step 209).

As a result, if any element set as "the other speaker" is included (Yes at step 209), the voice analysis unit 15 determines that the section at the time frame F is the simultaneous speaking period of the target speaker X and the speaker Y (step 210).

In contrast, if no element set as "the other speaker" is included (No at step 209), the voice analysis unit 15 determines that the section at the time frame F is the speaking period of only the target speaker X (step 211).

If no element set as the "target speaker" is included (No at step 208), the voice analysis unit 15 determines if any element set as "the other speaker" is included in the speaking flags $f=\{f_1, f_2, f_3, \ldots, f_n\}$ or not (step 212).

As a result, if any element set as "the other speaker" is included (Yes at step 212), the voice analysis unit 15 determines that the section at the time frame F is the speaking period of only the speaker Y (step 213).

In addition, if no element set as "the other speaker" is included (No at step 212), the voice analysis unit 15 determines that the section at the time frame F is the period where no one, none of the target speaker X and the speaker Y, speaks (step 214).

Note that two speakers are shown as the target speaker X and the speaker Y as the other speaker in the above example. However, the speakers are not limited to the above, and the number of the speakers may be three or more. At this time, "the other speakers" are two or more speakers. In this case, the nontarget-sound enhancement waveforms, the number of which corresponds to the number of the other speakers, are calculated in addition to the target-sound enhancement waveform at step 103. Then, by performing the similar processing in steps 104 to 107, the determination of which speaker has spoken at the speaking period corresponding to the section at the time frame F is performed.

In this case, the determination of the speaker, which is performed at the step 107, is performed as follows.

Figure 10:
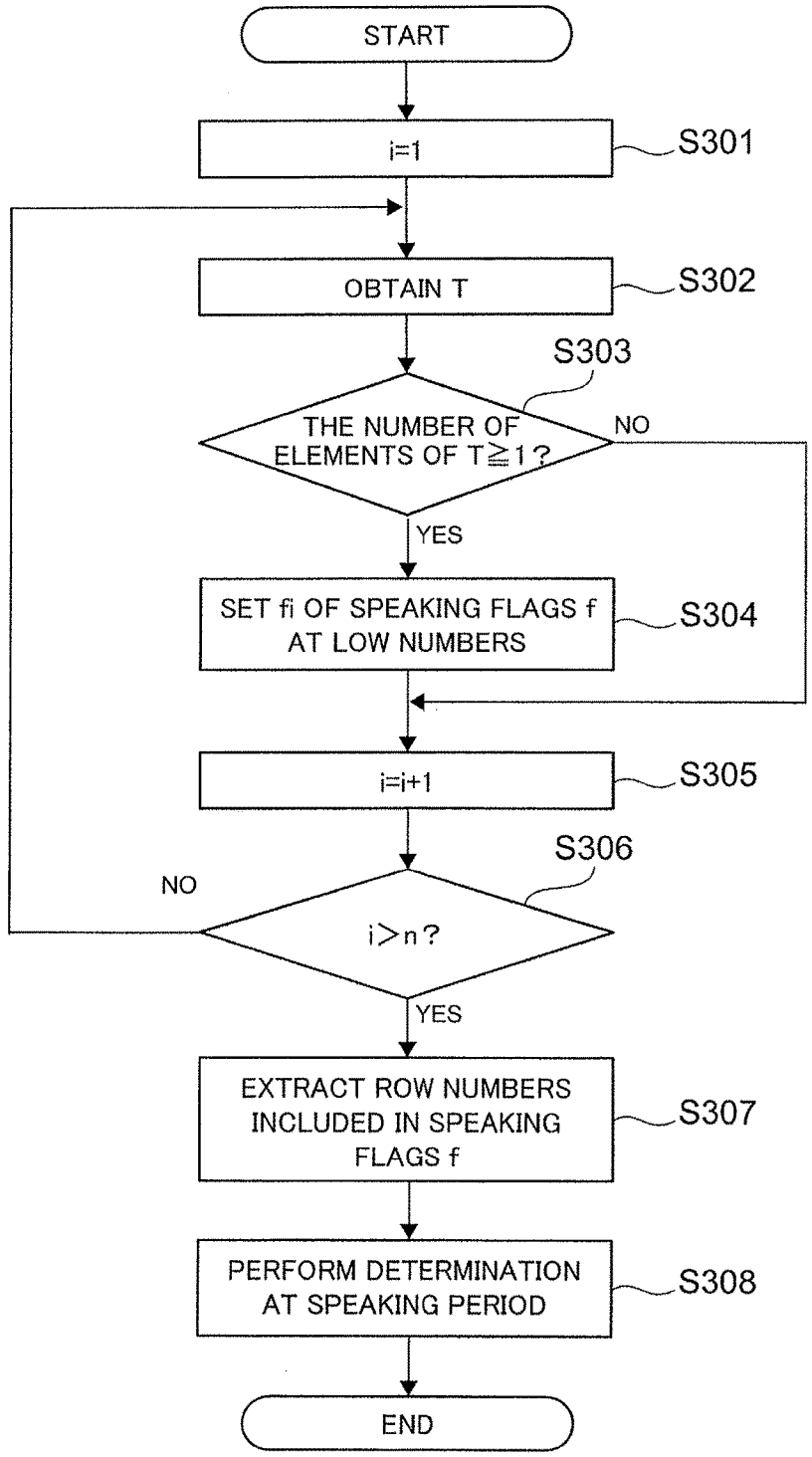
FIG. 10 is a flowchart further specifically describing the determination of the speaker, which is performed at the step 107 in FIG. 8, in cases of the other speakers not less than two.

FIG. 10 is a flowchart further specifically describing the determination of the speaker, which is performed at the step 107 in FIG. 8, in cases of the other speakers not less than two.

Here, the total number of the target speaker X and the other speakers is m. That is, the number of the other speakers is regarded as m−1.

Also in this case, the number of the detected peaks at the same frequencies is regarded as n at step 106, and the values of the frequencies λ at which the n peaks are located are expressed by $\lambda=\{\lambda_1, \lambda_2, \lambda_3, \ldots, \lambda_n\}$. Further, the intensities of the n peaks at the frequencies λ in the frequency spectrum of the target-sound enhancement waveform are expressed by $\{a_{11}, a_{12}, a_{13}, \ldots, a_{1n}\}$. Further, the frequency spectra of the nontarget-sound enhancement waveforms, the number of which is equal to the number of the other speakers, are calculated so that the corresponding voice signals of the other speakers are enhanced. Then, the intensities of the n peaks at the frequencies λ in the frequency spectra of the nontarget-sound enhancement waveforms are expressed by $\{a_{21}, a_{22}, a_{23}, \ldots, a_{2n}\}$, $\{a_{31}, a_{32}, a_{33}, \ldots, a_{3n}\}$, ..., and $\{a_{m1}, a_{m2}, a_{m3}, \ldots, a_{mn}\}$. The intensity A obtained by summing up the above intensities is given as below. Note that it may be recognized as a matrix composed of m rows and n columns.

$$A = \{a_{11}, a_{12}, a_{13}, \ldots, a_{1n}, a_{21}, a_{22}, a_{23}, \ldots, a_{2n}, a_{31}, a_{32}, a_{33}, \ldots, a_{3n}, \ldots a_{m1}, a_{m2}, a_{m3}, \ldots, a_{mn}\}$$

Further, the intensities of the n peaks at the frequencies λ in the frequency spectrum of the original waveform is expressed by $B=\{b_1, b_2, b_3, \ldots, b_n\}$.

As shown in the figure, the voice analysis unit 15 firstly sets 1 in the counter i (step 301).

Then, $A'=\{a_{1i}, a_{2i}, a_{3i}, \ldots, a_{mi}\}$ are given, and the intensities therein and the intensities in $B=\{b_1, b_2, b_3, \ldots, b_n\}$ are compared in this order, and the magnitude relationship is obtained. Specifically, $a_{1i}$ and $b_1$ are firstly compared, and $a_{2i}$ and $b_2$ are secondly compared. Further, the processing is continued in this manner, and $a_{mi}$ and $b_n$ are lastly compared. Then, T is calculated as a set containing elements of A' larger than those of B (step 302).

For example, in the case where three elements of A' are larger than those of B, as $a_{1i}>b_1$, $a_{3i}>b_3$, and $a_{ni}>b_n$, and the other elements of A' are less than the others of B, $T=\{a_{1i}, a_{3i}, a_{ni}\}$ is obtained.

Next, whether the number of the elements of T is not less than one is determined (step 303).

If the number of the elements in T is not less than one (Yes at step 303), the i-th f ($f_i$) of the speaking flags $f=\{f_1, f_2, f_3, \ldots, f_n\}$ is set at the row numbers (step 304). In the above example, $f_1$ is set at 1, 3 and n.

If the number of the elements in T is less than one (that is, zero) (No at step 303), the process goes to step 305.

Next, the voice analysis unit 15 adds one to the counter i (step 305). Then, the voice analysis unit 15 determines if i>n is satisfied or not (step 306). If i>n is not satisfied (No at step 306), the process goes back to step 302.

In contrast, if i>n is satisfied (Yes at step 306), which indicates that the speaking flags $f_i$ are set for all of the frequencies λ at which the n peaks are located, the voice analysis unit 15 extracts the row numbers included in any of the speaking flags f={$f_1, f_2, f_3, \ldots, f_n$} (step 307).

Then, the voice analysis unit 15 determines that the speakers corresponding to the extracted row numbers have spoken at the time frame F. For example, if 1 is extracted as the row number, the target speaker X has spoken. Alternatively, if m is extracted for example, the speaker corresponding to this number has spoken. The voice analysis unit 15 performs determination of which speaker has spoken at the speaking period corresponding to the section at the time frame F, on the basis of the extracted row numbers (step 308).

The aforementioned terminal device 10 may identifies the simultaneous speaking even in the case where plural speakers speak at the same time, and identifies which speaker has spoken. Thus, the accuracy of identification of speakers is less likely to be reduced.

<Description of Determination of Conversational Relationship Between Users>

In the host device 20 receiving information on voice, the data analysis unit 23 analyses the voice transmitted from the plural terminal devices 10, and determines the conversational relationship between users.

A specific method for determining conversational relationship between speakers in the exemplary embodiment will be described below. The description will be given in the case where determination of conversation between two speakers is performed under the situation where the target speaker X and the speaker Y talks in the same area in one room.

Figure 11A:
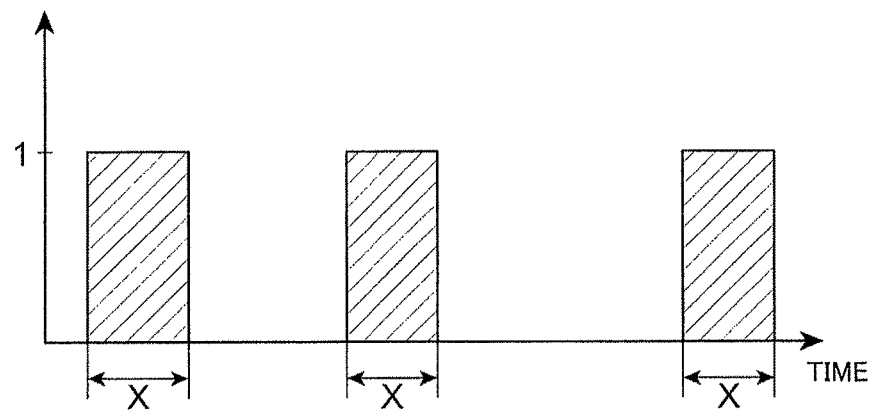
FIGS. 11A and 11B are graphs showing an example of the speaking information in a conversational situation.
Figure 11B:
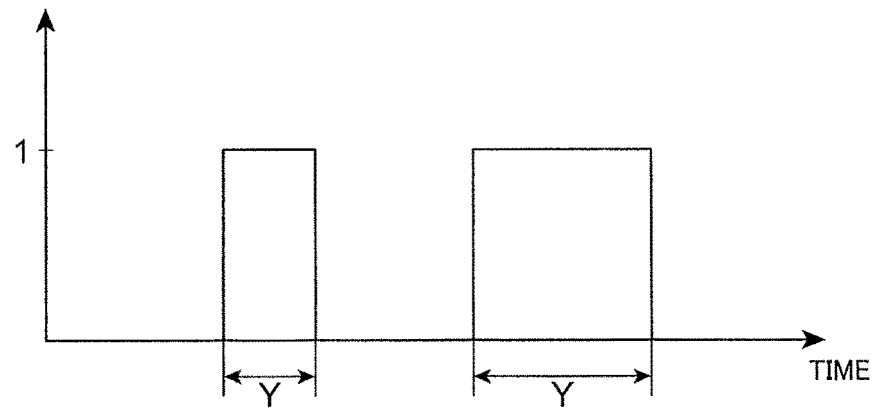

FIGS. 11A and 11B are graphs showing an example of the speaking information in a conversational situation.

The speaking information indicates that pieces of information indicating a speaking situation, such as the length of the speaking time and the timing when the speaker changes to the other are similar, and the pieces of the information are synchronized, as shown in FIGS. 11A and 11B. The host device 20 of this example analyses the pieces of information acquired from the terminal devices 10 to determine the synchronization, and thereby determines that the pieces of the information indicate the same speaking situation. Consequently, conversation between the target speaker X and the speaker Y is recognized. Temporal information on the speaking at least including the length of the each speaking time of the aforementioned speakers, start time and end time of each speaking, and time (timing) when the speaker changes is used as the pieces of the information indicating the speaking situation. Note that part of the temporal information on the speaking may be used, or another information may be additionally used, to determine the speaking situation of specific conversation.

Determination of the conversational relationship between users in the above achieves a system in which the communication relationship between speakers is recognized.

Note that, although the identification of the speaker corresponding to the voice is performed by the terminal device 10 in the above example, it is not limited to the above, and may be performed by the host device 20. The voice analysis system 1 in this case performs the identification of the speaker corresponding to the voice signal, by using, for example, the data analysis unit 23 of the host device 20 instead of the voice analysis unit 15 in FIG. 1. In this case, the data analysis unit 23 functions as a voice information acquiring unit and an identification unit. Further, the determination of the conversational situation described in FIGS. 11A and 11B may be performed by the voice analysis unit 15 of the terminal device 10 instead of the data analysis unit 23.

Although the identification of the speaker is performed by using the first microphone 11 and the second microphone 12 in the above example, it is not limited to the above, and the third microphone 13 may be used. Alternatively, appropriate two of the first microphone 11, the second microphone 12, and the third microphone 13 may be chosen.

<Description of Program>

Note that the processing performed by the terminal device 10 in the exemplary embodiment is achieved by causing the software and a hardware resource to work together. That is, the CPU placed on the inside of the control computer in the terminal device 10, which is not shown, executes a program for achieving respective functions of the terminal device 10, and enables the respective functions to be achieved.

Thus, the processing performed by the terminal device 10 may be taken as a program for enabling a computer to achieve a voice information acquiring function that acquires a voice signal generated by plural voice acquiring units disposed at different distances from a speaking section of a speaker and acquiring voice of the speaker, and an identification function that identifies the speaker corresponding to the voice having been acquired, on the basis of intensities of respective peaks in frequency spectra of a target-sound enhancement waveform and a nontarget-sound enhancement waveform, the target-sound enhancement waveform being a waveform where a voice signal of a predetermined target speaker has been enhanced, the nontarget-sound enhancement waveform being a waveform where a voice signal of a speaker other than the target speaker has been enhanced.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A voice analysis device comprising:
   a voice information acquiring unit, comprising a plurality of microphones disposed at different distances from a speaking section of a speaker, that acquires a voice signal generated by the microphones and representing a voice of the speaker;
   an identification unit, comprising a processor, that identifies the speaker corresponding to the voice represented by the acquired voice signal, on the basis of intensities of respective peaks detected in a frequency spectrum of a first enhanced waveform and a frequency spectrum of a second enhanced waveform, the first enhanced waveform being a waveform where a voice signal of a predetermined target speaker has been enhanced, the second enhanced waveform being a waveform where a voice signal of a speaker other than the target speaker has been enhanced; and
   an output unit configured to output the identity of the speaker identified by the identification unit.

2. The voice analysis device according to claim 1, wherein the identification unit finds peaks at the same frequency in at least two of frequency spectra containing a frequency spectrum of a waveform of the voice signal acquired by the voice information acquiring unit, the frequency spectrum of the first enhanced waveform, and the frequency spectrum of the second enhanced waveform, and identifies which speaker has a speaking voice corresponding to the voice having been acquired, on the basis of the intensities of the peaks at the same frequency.

3. The voice analysis device according to claim 2, wherein the identification unit identifies which speaker has the speaking voice corresponding to the voice having been acquired, on the basis of a magnitude relationship between the intensities of the peaks at the same frequency.

4. The voice analysis device according to claim 3, wherein the identification unit identifies the voice having been acquired, as a speaking voice of the predetermined target speaker in a case where a ratio between the intensities of the peaks at the same frequency in the waveform of the voice signal acquired by the voice information acquiring unit and the first enhanced waveform exceeds a predetermined first threshold.

5. The voice analysis device according to claim 3, wherein the identification unit identifies the voice having been acquired, as speaking voice of a speaker other than the predetermined target speaker in a case where a ratio between the intensities of the peaks at the same frequency in the waveform of the voice signal acquired by the voice information acquiring unit and the second enhanced waveform exceeds a predetermined second threshold.

6. The voice analysis device according to claim 3, wherein the identification unit identifies the voice having been acquired, as a simultaneous speaking voice of the predetermined target speaker and the speaker other than the predetermined target speaker in a case where the ratio between the intensities of the peaks at the same frequency in the waveform of the voice signal acquired by the voice information acquiring unit and the first enhanced waveform exceeds the first threshold and the ratio between the intensities of the peaks at the same frequency in the waveform of the voice signal acquired by the voice information acquiring unit and the second enhanced waveform exceeds the second threshold.

7. A voice analysis system comprising:
a plurality of voice acquiring units, comprising a plurality of microphones, that are disposed at different distances from a speaking section of a speaker and acquire a voice signal representing a voice of the speaker; and
an identification unit, comprising a processor, that identifies the speaker corresponding to the acquired voice, on the basis of intensities of respective peaks detected in frequency spectra of a first enhanced waveform and frequency spectra of a second enhanced waveform, the first enhanced waveform being a waveform where a voice signal of a predetermined target speaker has been enhanced, the second enhanced waveform being a waveform where a voice signal of a speaker other than the target speaker has been enhanced; and
an output unit configured to output the identity of the speaker identified by the identification unit.

8. The voice analysis device according to claim 1, wherein the output unit transmits data including data representing the identity of the speaker to an external device.

9. The voice analysis device according to claim 1, wherein the output unit comprises one of a display, a printer, and an audio device.

* * * * *